April 9, 1968 J. S. AUSMAN 3,377,470
MEANS AND METHOD FOR DETERMINING THE BEARING ANGLE BETWEEN THE
DIRECTION OF MOTION OF A MOVING CRAFT AND A FIXED POINT
Filed Dec. 29, 1966 2 Sheets-Sheet 1
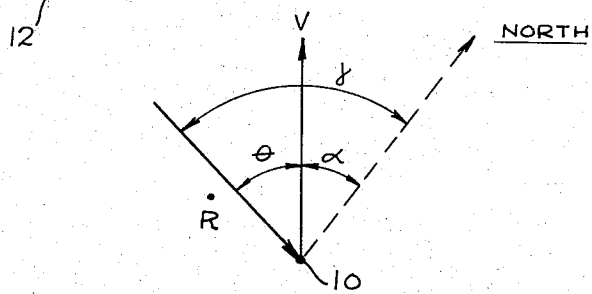
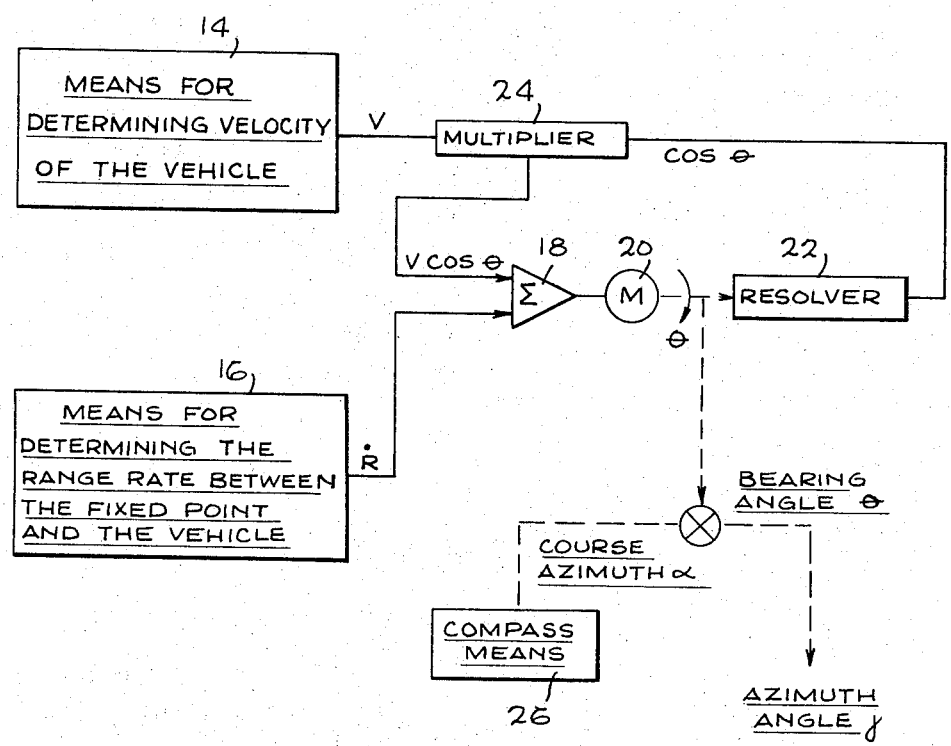
INVENTOR.
JOHN STANLEY AUSMAN
BY
Ernest L. Brown
ATTORNEY INVENTOR.
JOHN S. AUSMAN
BY
Ernest L. Brown
ATTORNEY ns shown by the arrow V, the bearing angle is shown by the angle $\theta$, the course azimuth of the moving vehicle is shown by the angle $\alpha$, and the azimuth from the vehicle 10 to the fixed point 12 is shown by the angle $\gamma$.

United States Patent Office 3,377,470
Patented Apr. 9, 1968

3,377,470
MEANS AND METHOD FOR DETERMINING THE BEARING ANGLE BETWEEN THE DIRECTION OF MOTION OF A MOVING CRAFT AND A FIXED POINT
John Stanley Ausman, Los Angeles, Calif., assignor to Litton Systems, Inc., Beverly Hills, Calif., a corporation of Maryland
Filed Dec. 29, 1966, Ser. No. 605,809
12 Claims. (Cl. 235—150.26)

ABSTRACT OF THE DISCLOSURE

A means and method for determining the relative bearing angle between the direction of motion of a moving craft and a fixed point using the concept that the cosine of the bearing angle is equal to the negative of the range rate divided by the velocity amplitude of the moving craft.

Brief summary of the invention

This invention is directed to a means and method for calculating the bearing angle of a fixed point relative to a moving object, from signals representative of the velocity amplitude of the moving object and the range rate of the object relative to a fixed point. More particularly, the means and method are based upon the solution of the equation:

$$\cos \theta = \frac{-\dot{R}}{V}$$

wherein $\theta$ is the bearing angle to be determined, $\dot{R}$ is the range rate of the moving object relative to the fixed point, and $V$ is the amplitude of the velocity of the moving object.

It is therefore an object of this invention to determine the relative bearing angle between the direction of motion of a moving object and the direction from the moving object to a fixed point.

It is another object of this invention to determine the azimuth angle of a line from a moving object to a fixed point.

It is a more specific object of this invention to provide a means and method for determining said bearing and azimuth angles.

It is a still more specific object of this invention to provide a means and method, using the range rate between a moving object and a fixed point and using the velocity amplitude of the moving object to calculate the bearing angle and azimuth angle of said fixed point relative to said moving object.

Other objects will become apparent from the following description, taken in connection with the accompanying drawings, in which:

FIGURE 1 is a diagram of the geometry of the problem to be solved;

FIGURE 2 is a block diagram of a typical apparatus of this invention.

Detailed description of the invention

Figure 3:
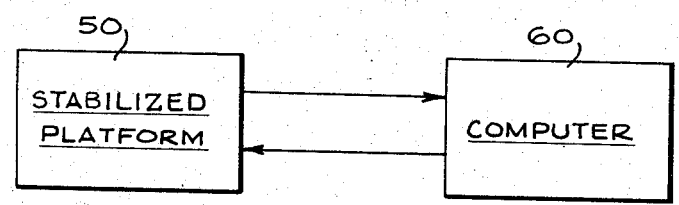
FIGURE 3 is a block diagram of a stabilized platform and associated computer forming an inertial navigation system.

Referring to FIGURE 1, the moving object or vehicle is shown at 10, the fixed point whose bearing is to be computed is shown at 12, the direction of the range rate is shown by arrow $\dot{R}$, the velocity of the moving object 10 is shown by the arrow V, the bearing angle is shown by the angle $\theta$, the course azimuth of the moving vehicle is shown by the angle $\alpha$, and the azimuth from the vehicle 10 to the fixed point 12 is shown by the angle $\gamma$.

In a preferred embodiment, the vehicle velocity, V, is the ground track velocity of the vehicle. That velocity may be measured—for example—by a Doppler radar, an accelerometer or velocity meter on a gyroscopically stabilized platform, an air speed indicator with suitable correction, a Mach number indicator or computer, or the like. The range rate, $\dot{R}$, may be measured at the fixed point 12 by means—for example—of a radar with the value of the $\dot{R}$ transmitted to the vehicle by a telemetering link. Alternatively, the $\dot{R}$ could be calculated on the vehicle by sending a radar pulse from the vehicle 10 to a transponder located at the fixed point 12. If a radar is used to measure the range rate between the fixed point and the vehicle, it may be positioned at either 10 or 12, with or without a telemetering link, and with or without a transponder. It is obvious that if the fixed point 12 is a good target, that no transponder is needed. For example, a box-corner reflector at the fixed point 12 would give a strong target indication to a radar position on the vehicle 10. Further, other kinds of radio frequency interrogator-transponder combinations may be used to determine the range rate.

The cosine of the angle $\theta$ is equal to the negative of the range rate $\dot{R}$, divided by the amplitude of the velocity of the vehicle V.

One means of mechanizing the equation $$\cos \theta = \frac{-\dot{R}}{V}$$

is to rearrange the equation into the form $$V \cos \theta + \dot{R} = 0$$

The servo system of FIGURE 2 mechanizes this equation. In FIGURE 2, the output signal of the means for determining the range rate between the fixed point and the vehicle 16 is connected to one input of the summing amplifier 18. The other input to the summing amplifier is proportional to $V \cos \theta$, whereby the motor 20 is driven by the amplifier 18 to cause its shaft to assume a position which is a measure of the angle $\theta$. The resolver 22 is connected to shaft of motor 20 to generate a signal which is a measure of the cosine of $\theta$. The output of resolver 22 and the output of the means for determining velocity of the vehicle 14 are connected to the inputs of a multiplier 24 which generates the required output signal $V \cos \theta$ connected to the second input of the summing amplifier 18. Instead of using multiplier 24, the resolver 22 could have been excited by means 14. Thus, the shaft position of motor 20 is a measure of the angle $\theta$, and may be transmitted to an indicator, for reading by an observer by means of a synchro, or the like (not shown) or the shaft position of the motor 20 may be used to generate a signal for a computer.

If the azimuth angle to the fixed point is desired, rather than the bearing angle, the azimuth angle to the fixed point is equal to the sum of the course azimuth, $\alpha$, and the bearing angle $\theta$. The course azimuth angle $\alpha$ may be obtained from a compass means 26, such as a magnetic compass with suitable correction, a flux valve, a gyrocompass, a stabilized platform, or the like. The outputs $\theta$ and $\alpha$ are then summed to obtain the azimuth angle $\gamma$.

It is apparent that the mechanization of the analog computer of FIGURE 2 is not the only fashion in which the equation may be mechanized, nor is it necessary that the equation be mechanized by analog computer means. The calculation could be made with a digital computer or with suitable graphs and slide rules by the navigator on the vehicle 10.

Further, should the velocity V not be an accurate ground track velocity, but only an air speed, or the like, this will merely introduce errors into the calculation. In a given situation, the errors may be tolerable, whereby the invention should not be limited to those mechanizations which involve extreme precision.

Figure 4:
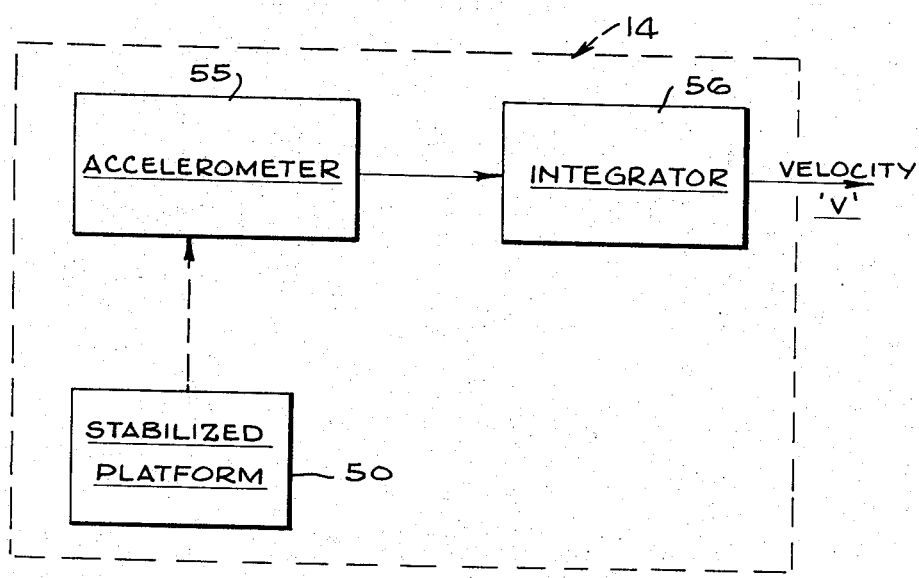
FIGURE 4 is a block diagram showing an accelerometer and integrator upon a stabilized platform, adapted to generate a velocity signal.

FIGURES 3 and 4 are added to indicate the relationship between a stabilized platform of an inertial navigation system and its associated accelerometer. A typical stabilized platform—for example—may be of the type shown and described in United States Patent No. 2,958,522 to J. M. Slater for a "Sectional Stable Platform." In an inertial navigation system, a stabilized platform customarily supports gyroscopes and accelerometers. The gimbals of the platform may be adapted to follow the gyroscopes, and the gyroscopes—by suitable torquing from a computer—may cause the platform to remain locally level. By keeping the platform locally level, the accelerometer's sensing axes are maintained level and since acceleration of the supporting vehicle the direction of orientation of the sensing axes of the accelerometers depends upon the coordinate system used. In a latitude-longitude coordinate system the sensing axes of the accelerometer are customarily oriented north and east. Thus, the stabilized platform 50 supports accelerometers 55 whose output may be integrated by an integrator 56 to produce a velocity signal. The output from the accelerometers are also channelled to the computer which uses the signals, in accordance with a predetermined program to control the gyroscopes and the stabilized platform to keep the accelerometer sensing axes north and east. Obviously, instead of north and east, the axes could be oriented south and west or other combinations thereof. The state of the stabilized platform art may be found in Class 74, subclass 5.34 of the United States Patent Office.

Although the device of this invention has been described in detail above, it is not intended that the invention should be limited by that description, but only in accordance with the spirit and scope of the appended claims:

1. In combination:
   means for determining the velocity of a moving object;
   means for determining the range rate between a fixed point and said object; and
   means for determining the bearing between the direction of the velocity of said moving object and the direction between said object and said fixed point, characterized by computer means adapted to receive signals from said means for determining velocity and from said means for determining range rate to compute a signal which is a measure of said bearing angle from the equation $\cos \theta = -\dot{R}/V$, wherein $\theta$ is said bearing angle, R is said range rate signal, and V is said velocity signal.

2. A device as recited in claim 1 and further characterized by means for making said computation in the form of said equation, $V \cot \theta + \dot{R} = 0$.

3. A device as recited in claim 2 and further comprising and characterized by a servo system utilizing said velocity and range rate signals and said computed bearing angle signal, in a closed loop configuration, to generate said bearing angle signal.

4. A device as recited in claim 1 in which said velocity signal is generated by means comprising an accelerometer positioned upon a stabilized platform upon said moving object, and means for causing the output of said accelerometer to be a signal representing velocity.

5. A device as recited in claim 1 in which said means for measuring range rate is a radar device.

6. A device as recited in claim 1 in which said means for measuring range rate is a radio frequency interrogator-transponder combination.

7. A device as recited in claim 1 and further comprising compass means for determining the course azimuth of said moving object and means for adding said course azimuth and said bearing angle to obtain the azimuth angle of the direction between said moving object and said fixed point.

8. A device as recited in claim 7 in which said compass means is an inertial navigation system.

9. A device as recited in claim 1 in which said means for determining the velocity of a moving object is carried by said object.

10. In combination:
    means for determining the velocity of a moving object;
    means for determining the change of range with respect to time between a predetermined point and said object; and
    means for obtaining the bearing angle between the direction of the velocity of said moving object and the direction between said object and said predetermined point, characterized by computer means adapted to receive signals from said means for determining velocity and from said means for determining change of range with respect to time, to compute a signal which is representative of said bearing angle as a function of said change of range with respect to time and said velocity.

11. A device as recited in claim 10 and further characterized by means for computing a signal which is a measure of said bearing angle as a function of the ratio of said change of range with respect to time and said velocity.

12. A device as recited in claim 10 in which said means for determining the velocity of a moving object is carried by said object.

No references cited.

RODNEY D. BENNETT, *Primary Examiner.*

C. L. WHITHAM, *Assistant Examiner.*